(12) United States Patent
Tračuks

(10) Patent No.: US 11,912,586 B2
(45) Date of Patent: Feb. 27, 2024

(54) INDUSTRIAL FISH BREEDING COMPLEX AND A METHOD OF WATER REGENERATION

(71) Applicants: Valentina Tračuka, Jūrmala (LV); Vladimirs Tračuks, Jūrmala (LV); Sergejs Tračuks, Rīga (LV)

(72) Inventor: Sergejs Tračuks, Rīga (LV)

(73) Assignees: Sergejs Tračuks, Rīga (LV); Valentina Tračuka, Jūrmala (LV); Vladimirs Tračuks, Jūrmala (LV)

(*) Notice: Subject to any disclaimer, the term of this patent is extended or adjusted under 35 U.S.C. 154(b) by 379 days.

(21) Appl. No.: 17/370,051

(22) Filed: Jul. 8, 2021

(65) Prior Publication Data

US 2022/0039361 A1 Feb. 10, 2022

(30) Foreign Application Priority Data

Aug. 4, 2020 (LV) .......................... LVP2020000051

(51) Int. Cl.
*C02F 1/00* (2023.01)
*A01K 63/04* (2006.01)
(Continued)

(52) U.S. Cl.
CPC ............ *C02F 1/006* (2013.01); *A01K 63/042* (2013.01); *C02F 1/004* (2013.01); *C02F 1/20* (2013.01); *C02F 1/32* (2013.01); *C02F 3/085* (2013.01); *C02F 3/10* (2013.01); *C02F 3/20* (2013.01); *C02F 3/223* (2013.01); *C02F 3/26* (2013.01); *C02F 3/305* (2013.01); *C02F 2001/007* (2013.01); *C02F 2103/20* (2013.01); *C02F 2209/40* (2013.01); *C02F 2209/42* (2013.01); *C02F 2301/022* (2013.01); *C02F 2303/04* (2013.01)

(58) Field of Classification Search
CPC .............................. C02F 1/006; A01K 63/042
See application file for complete search history.

(56) References Cited

U.S. PATENT DOCUMENTS 4,859,327 A * 8/1989 Cox ...................... B01D 21/08
210/219

FOREIGN PATENT DOCUMENTS

| LV | 13734 B | * | 8/2008 |
| LV | 14790 B | * | 4/2014 |

* cited by examiner

*Primary Examiner* — Chester T Barry
(74) *Attorney, Agent, or Firm* — Nadya Reingand

(57) ABSTRACT

The invention relates to water regeneration in a fish breeding complex combining closed and flow-through water supply systems. A module of a biological filter in a water regeneration system comprises a reservoir, an aerator, a channel for sludge accumulation and discharge and a reservoir bottom sloped in direction of the water movement and, with the water surface, forming a diffuser providing for circulation of water and filler in the biological filter. Fish breeding complex comprises fish breeding pools and a water regeneration system comprising a mud settler-denitrificator, a device for water lifting and aeration, a biological filter, degassing and disinfection units. Each fish breeding pool comprises water oxygenation and disinfection systems, dosage units, water discharge systems and insoluble residues collecting and discharge systems. In the water flow-through mode, water regeneration system is switched off and water supply from an outside source and wastewater discharge are switched on.

9 Claims, 3 Drawing Sheets

(51) Int. Cl.
*C02F 1/20* (2023.01)
*C02F 1/32* (2023.01)
*C02F 3/08* (2023.01)
*C02F 3/10* (2023.01)
*C02F 3/20* (2023.01)
*C02F 3/22* (2023.01)
*C02F 3/26* (2023.01)
*C02F 3/30* (2023.01)
*C02F 103/20* (2006.01)

1 - 1

2 - 2

INDUSTRIAL FISH BREEDING COMPLEX AND A METHOD OF WATER REGENERATION

CROSS REFERENCE TO RELATED APPLICATIONS

The present patent application claims priority to Latvian patent application LVP2020000051 filed Aug. 4, 2020, which is fully incorporated herein by reference.

FIELD OF THE INVENTION

The current invention relates to a biological purification of water, in particular, to the equipment for a biological water purification from organic pollution in a fish breeding systems, more particularly to the equipment with closed water supply system used for intense fish breeding.

BACKGROUND

In the fish breeding systems, biological filters with floating plastic fillers are used. Biological filters for fish breeding systems in a form of cylindrical or rectangular containers are known. Traditionally, to promote water oxygenation and circulation in the biological filter, thus providing for vital functions of microorganisms (aerobic bacteria), aerators are used being placed in the lower part of the biological filter under the floating plastic filler. However, even using the most powerful aeration jet pumps for circulation of water and filler in the biological filters, it is not possible to avoid formation of dead zones where polluted filler is accumulated, thus decreasing the quality of biological purification of water along with complicating the filter maintenance and increasing of energy consumption.

A device for the biological purification of water, disclosed in LV14790B, may be considered as the closest prior art to the current invention; said device consists of a biological filter in a form of a container of a rectangular cross-section with sloped sides of the bottom. Aerator is situated under the bottom, providing circulation and oxygenation of water. Aerator is separated from the filler with a separation grid. Openings for sludge removal are located in the sludge collecting channel under the aerator. Biological filter is divided by two vertical walls in a way that inside the container these walls limit the water flowing down for purification from the aeration zone, which zone is formed in the air stream created by the aerator. Upper part of the wall is below the water level in the biological filter, providing for overrolling of the water flow, and the lower parts of the walls does not reach the sloped sides of the bottom.

For sludge removal the bottom base is deepened by a channel of a rectangular cross-section with one or more openings. For better circulation of water and filler, and to maximize oxygenation of water, the aerator is situated in the very bottom of the biological filter above the sludge channel, and is limited by the sloped sides of the bottom made from material with low friction coefficient. Polluted water enters the biological filter from the top edge or from a pipe, going down through the filler. Water circulation in the biological filter and aerobic purification occurs in the ascending air stream coming out from the aerator, which is situated in the base part of the biological filter. Surface of the sloped sides of the biological filter bottom provides for sliding the filler down, and positioning the aerator at the base part of the biological filter provides for better water and filler circulation, thus improving of aerobic water purification. However, the presence of two vertical walls for separation of the ascending (with air) and descending water flow does not solve the problem of the filler accumulation at the exit of the biological filter, where a dead zone with accumulated sludge is formed. Accumulation of the filler prevents a proper biological purification of water, leads to the biological filter operation interruptions, and complicates the maintenance of the fish breeding system.

SUMMARY

The current invention solves the technical problem of improving the water and filler circulation in the biological filter, and lowering the stream turbulence and dead zones formation, thus improving the biological purification in a fish breeding pool and increasing the reliability and efficiency of the fish breeding system.

To achieve this goal, a module of a biological filter represents an autonomous biological reactor, made as a reservoir with four vertical walls and a rectangular horizontal cross-section, a reservoir bottom is sloped in a direction of a water movement and together with a plane of a water surface forms a diffuser which provides for favorable conditions for circulation of water and a filler in the biological reactor. In a lower part of a connection of the reservoir bottom and the vertical wall there is a channel for a sludge accumulation and discharge, which in an upper part is limited by a separation grid which prevents the filler of a biological filter from going into the channel, under the grid in the channel an aerator is placed, providing for accelerating a circulating water and filler flow with an ascending air stream from the aerator, as well as oxygenating the water. Inside the reservoir the incoming water flow goes down along the sloped bottom to the channel for a sludge accumulation and discharge, then to the aerator and up, the water flow is accelerated by the ascending air stream, providing for the aerobic processing, and for the water and filler circulation, and for water oxygenation. Separation grid in the upper part prevents the filler leakage from the biological filter but passes out the purified water. Circulation flow moves further and interflows with the flow of water incoming into the biological filter.

The module of a biological filter may be incorporated into a multisectional modular biological filter, which is a part of a water regeneration system in an industrial fish breeding complex. The industrial fish breeding complex with a closed water supply system comprises a number of fish breeding pools, water regeneration system situated at the side of the pools, system of collecting and discharge of insoluble residues, mechanical filter of insoluble residue, water supply distributing channel and wastewater collecting channel, integrating a group of fish breeding pools. Water regeneration system comprises a mud settler-denitrificator, a device for water lifting and aeration (aerolift), a multisectional modular biological filter, a degassing unit, and a disinfection unit. In a water regeneration system identical biological filter modules (biological reactors) are used, being connected successively and able to function autonomously or in a group, allowing to adjust biological filter power and energetic consumption depending on increase or decrease of a biomass in the pools.

An industrial fish breeding complex can function in a water flow-through mode with disconnected water regeneration system and opened locking device for supply of a clean water from outer source in the water supply distributing channel and opened locking device for a wastewater discharge from the wastewater collecting channel. Therefore, every fish breeding pool has a water oxygenation system, water disinfection system, and a water dosage unit providing for the water flow in the pool. Every fish breeding pool has a water discharge system, providing for water level regulation in that pool. Pool bottom is sloped in direction from the water supply distributing channel.

A device for water lifting and aeration solves a problem of lifting a large quantity of water from a reservoir to a reservoir with higher level of water, improves circulation while improving the airlift effect, provides a possibility of regulation of the height and volume of moved water, provides a simple and rational placement of the water lifting device. With this purpose in a reservoir with vertical front wall, which simultaneously is a separation wall between the water supply reservoir and reservoir with higher water level, where the water is moved to, a flat separation wall is placed, sloped in direction to the bottom and the front wall. Sloped flat separation wall together with the front wall forms a confusor in a cross-section, perpendicular to their plane, and can change the slope angle and thus the conus angle of the confusor, thus proportionally adjusting the height and volume of the moved water. At the bottom of reservoir in the lower part of the confusor an aeration device is placed, dispersing the air, which is going up and moves along the water, thus forming the ascending stream. Narrowing the flowing part of the device provides for increase of the flow speed and its kinetic energy, which provides for the water lifting height. In an upper part of the confusor channel a rift over an edge of a front wall is situated. Distinctive feature of the device for water lifting and aeration is placing the flat separation wall sloped to the bottom in existing reservoirs as well as in reservoirs being constructed, using one of the reservoir's walls. The device may be created from several successively disposed modules, forming a lifting cascade.

For water oxygenation in a pool a hermetic chamber for oxygen is created, which is formed by the pool water surface, pool end wall, pool side walls, lower surface of the balcony, and uniform laminar water flow falling down from balcony forming a water oxygenation system in a fish breeding pool that provides for reliability of construction, because excessive pressure is automatically adjusted at the bubbling zone, it does not require additional maintenance expenses and is cheaper than the closest analogue (LV147903). Water oxygenation system solves an important fish breeding problem—optimally oxygenated water in the fish breeding pool while lowering the expenses for creation of a complicated equipment. For this purpose the water flow from the a water supply distributing channel flows through the dosage unit to the balcony channel of the fish breeding pool with installed rolling flange, on which over its full length forms a uniform falling laminar water flow, which falls down on the water surface of the fish breeding pool, and which together with side walls and the end wall of the fish breeding pool forms a hermetic chamber. Under this hermetic chamber on the bottom of the pool at the end wall a finely dispersing oxygen sprayer is placed, which bubbles rising to the water surface get into the hermetic chamber under the waterfall of the uniform falling laminar flow. Above the rolling flange a water disinfection system, e.g. an electromagnetic emitter (e.g. UV) with the protective cover is placed. For realization of this method in the point of water exit from the water supply distributing channel through the water dosage unit, above the water surface of the fish breeding pool, a balcony channel with a rolling flange is created, over which water is overflowing into the fish breeding pool. Water from the balcony channel overflows the rolling flange and falls down as an uniform falling laminar flow in the fish breeding pool, together with the side walls of the fish breeding pool, end wall of the pool, lower surface of the balcony and the water surface forming a hermetic chamber, into which through the water layer it comes the non-dissolved oxygen from the finely dispersing oxygen sprayer located at the pool bottom. The uniform laminar water flow falling from the rolling flange impacts with the water surface in the pool and forms the water-oxygen bubbling zone with oxygen coming from the hermetic chamber.

Distinctive feature of the fish breeding pool water oxygenation system is that the finely dispersing oxygen sprayer at the poll bottom provides for large area of water interaction with oxygen and for long time of contact of water with oxygen while bubbles are rising from the pool bottom to the water surface (exposition); non-dissolved oxygen collected in the hermetic chamber interacts with the inner surface of the uniform falling laminar water flow and additionally dissolves in water, and at the impact of the uniform falling laminar water flow with the water surface in the pool; a simultaneous water-oxygen bubbling occurs, providing for oxygen dissolution in water.

Water oxygenation system comprises a finely dispersing oxygen sprayer installed on the pool bottom at the end pool wall, provided with oxygen gas at overpressure of 0.2-0.3 bar. Balcony channel is located along the end wall of the pool, with the rolling flange of the balcony, which together with the uniform falling laminar water flow, side wads of the fish breeding pool, end wall of the pool and the water surface of the fish breeding pool forms a hermetic chamber for oxygen non-dissolved in the water, which comes from the pool bottom from the finely dispersing oxygen sprayer.

A module of a biological filter operates as follows. Polluted water comes into the module of the biological filter over the top end or pipe and together with the filler goes down the tunnel formed by the four vertical walls of the reservoir, reservoir bottom, and a circulation flow. After reaching the lower end of the sloped bottom in the aerobic zone, a circulating water and filler flow interacts with the ascending air stream from the aerator and moves up, being oxygenated and performing aerobic purification. After reaching the upper zone of the biological filter, a circulating water and filler flow comes into slow circulation zone, lowers down to the sloped bottom of reservoir and again enters the zone of air incoming from the aerator.

Technical and economical benefit of the described equipment is improving of the water and filler circulation in the biological filter and major simplification of construction. Proposed construction of the module of biological filter allows to avoid formation of turbulent flow and dead zones, where the filler may be accumulated, thus improving the water biological purification quality in the fish breeding complex and simplifying the technical maintenance of the system. Proposed equipment is technically simple in construction and operation.

DETAILED DESCRIPTION OF THE PREFERRED EMBODIMENT

Figure 1:
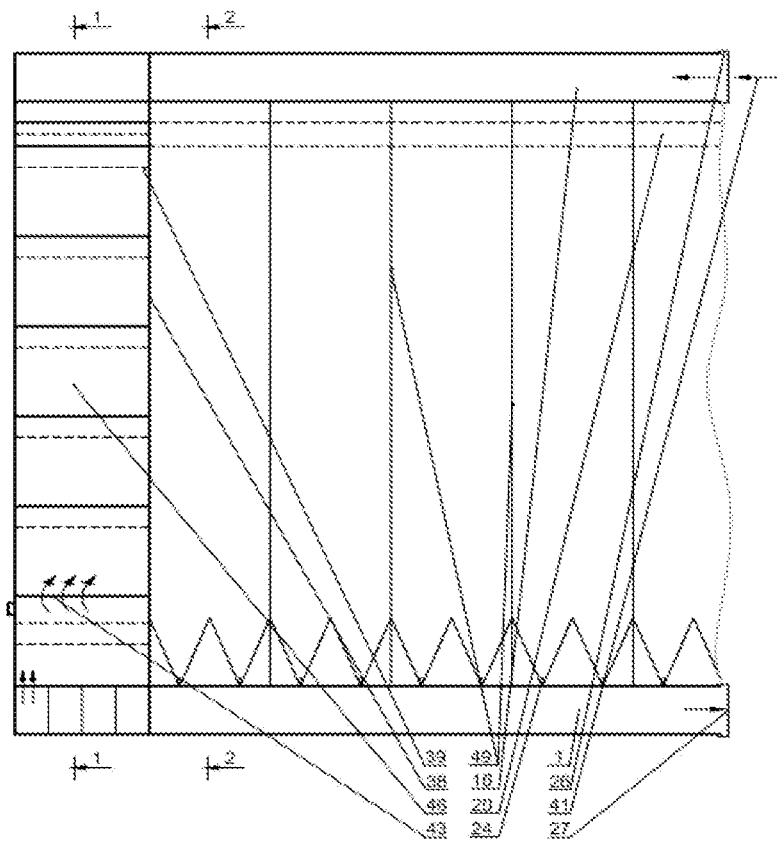
FIG. 1. Industrial fish breeding complex with water regeneration system placement along the side wall of the fish breeding pools group. Top view.
Figure 2:
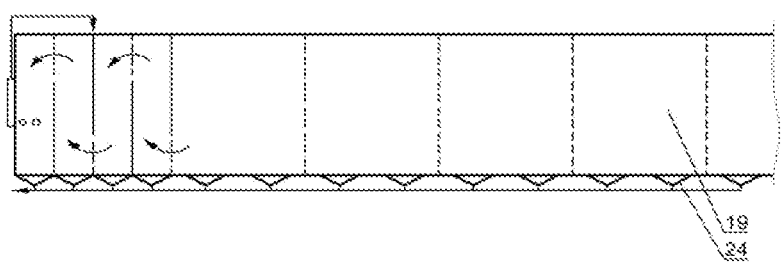
FIG. 2. Industrial fish breeding complex with water regeneration system placement along the side wall of the fish breeding pools group. Side view.
Figure 3:
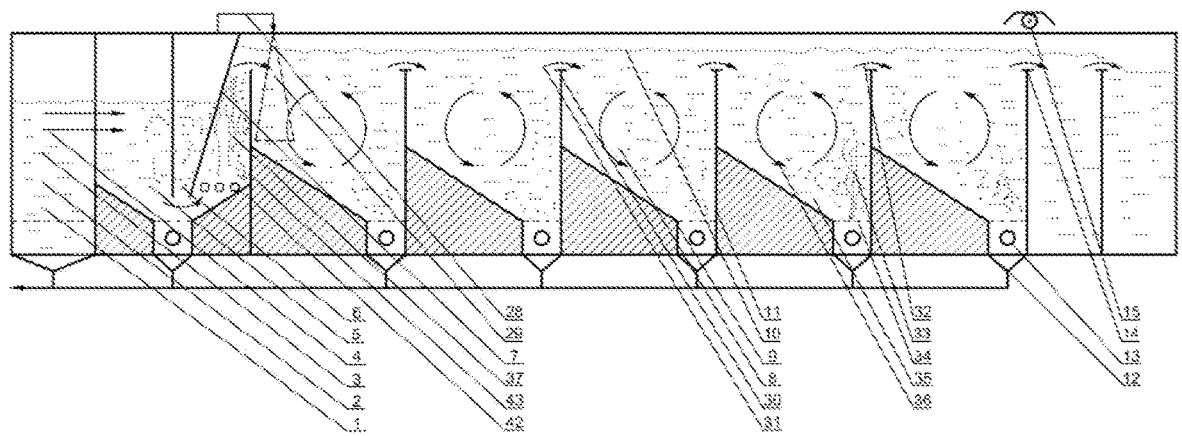
FIG. 3. Water regeneration system of the industrial fish breeding complex. Cross-section 1-1.
Figure 4:
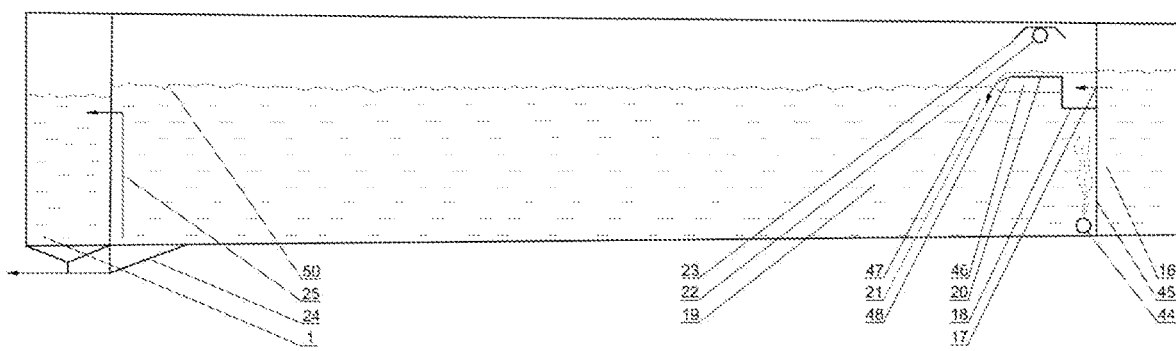
FIG. 4. Fish breeding pool. Side view. Cross-section 2-2.
Figure 5:
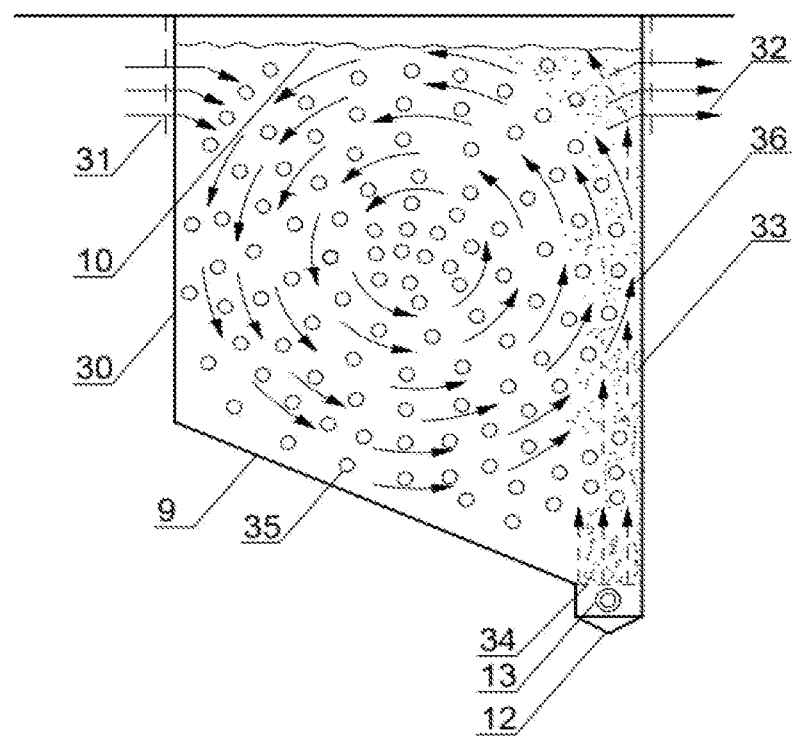
FIG. 5. A module of biological filter. Cross-section 3-3.
Figure 6:
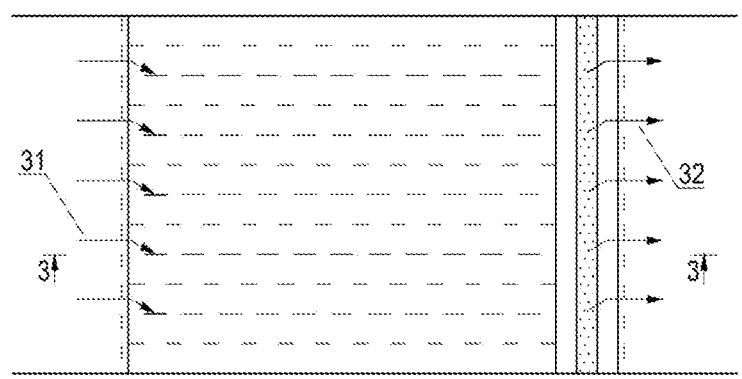
FIG. 6. A module of biological filter. Top view.

Industrial fish breeding complex operates as follows.

In a water recirculation mode, the water lifting is performed by the pump 28 or by device for water lifting and aeration (airlift) 37. Water by the water supply distributing channel 16 through the water dosage units 17 enters the balcony channels 18 of the pools 19 and further over the balcony rolling flange 20 of the falls as an uniform falling laminar water flow 21 into the pool 19. During water flowing over the balcony rolling flange 20 disinfection of the water flow is performed by UV radiation emitted by the UV-emitter 22, placed above the balcony rolling flange 20 and closed by the protective cover 23. Uniform falling laminar water flow 21 and the pool side walls 49 forms a hermetic chamber 46, in which, through the water under the balcony 18, 20, oxygen is supplied and dissolves in water in the bubbling zone 47, formed by the waterfall of the uniform falling laminar water flow 21.

Oxygenated water moves through the pool 19 to the exit located over the traps 24 for non-soluble waste products of hydrobionts. Further through the water discharge systems 25 in a fish breeding pool 19 the wastewater from all pools comes into the collecting channel 1.

From the wastewater collecting channel 1 water enters the mechanical filter of insoluble residues 2 equipped by the drum filter 3 or the filter of a labyrinth type with hydrostatic filler 4.

After the mechanical purification water enters the mud settler-denitrificator 5 and then into supply tank 6, from where it is lifted into the first module 8 of the biological filter by the pump 28 or device for water lifting and aeration (aerolift) 37. When lifting water with the pump 28 water supply to the biological filter 8 is performed through the oxygenator 29. When lifting water with the device for water lifting and aeration (aerolift) 37 water oxygenation is performed by air finely dispersing with the aeration device 42.

Biological filter is performed as a group of similar modules 8, located successively in the water regeneration system 46. Every module 8 represents an autonomous biological reactor made as a reservoir 30, limited by four vertical walls 11 and rectangular at its horizontal cross-section. Reservoir bottom 9 is made sloped in direction of the direction of a water movement 30 and together with the plane of a water surface 10 forms a diffuser which provides for favorable spatial conditions of water and filler circulation in the biological reactor. In the lower part of a connection of the reservoir bottom 9 and the vertical wall 11 there is a channel for sludge accumulation and discharge 12, which in upper part is closed by a separation grid 34 which prevents filler 35 of the biological filter 8 from entering the channel for sludge accumulation and discharge 12. Under the separation grid 34 in the channel for sludge accumulation and discharge 12 an aerator 13 is placed, providing for accelerating of the circulating water and filler flow 36 with ascending air stream from the aerator 33, as well as for water oxygenation. In the last biological filter module 8 at the exit of biological reactor the back vertical wall has a flange 14, with above located UV-emitter 15, closed by a protective cover. Water flowing over the flange 14 is disinfected by UV rays.

Further water flow enters the water supply distributing channel 16.

To provide the flow-through mode of the industrial fish breeding complex, the pump 28 or device for water lifting and aeration (airlift) 37 of the industrial fish breeding complex is switched off and locking device of water supply 26 is opened, which supplies water already treated by mechanical filtration and disinfection, from the clean water outside source 41 into the water supply distributing channel 16, as well as the locking device of a wastewater discharge 27, which provides for exit of the wastewater from the collecting channel 1.

In one embodiment the current invention works as follows:

Water from the water regeneration system through the water supply distributing channel is supplied to six fish breeding pools, then through the water dosage unit of every pool it comes to the balcony rolling flange which is 12 cm wide and 3 m long (situated along all the front end wall of the pool). At the balcony rolling flange the water is disinfected by UV radiation (a UV lamp with 135 W power and at least 50 Ws/cm$^2$ emission may be used) and after falling into the pool from the balcony rolling flange is oxygenated in the zone of contact of the uniform falling laminar flow and a hermetic chamber with oxygen, formed by the balcony construction and uniform falling laminar water flow. Oxygenation also occurs in the bubbling zone formed by uniform laminar flow falling on the pool water surface. Wastewater from the 12 meter long pools through the water discharge system goes into the wastewater collecting channel and further to the mechanical filter for purification of non-soluble waste products, after which it enters the water regeneration system which is 4.0 m wide, 2.5 m high and 12.0 m long. Then through the mud settler-denitrificator and supply tank water is lifted by the device for water lifting and aeration (aerolift) to 30 cm height and enters the multisectional modular biological filter (six sections), from which the degassed and disinfected water goes to the water supply distributing channel. In the flow-through mode the water regeneration system is switched off, thus switching off water recirculation, opening the locking device of water supply into distributing channel and the locking device of a wastewater discharge from the collecting channel.

The proposed invention solves the problem of use of a group of pools with unlimited capacity of hydrobionts growth both in a water recirculation mode and in the water flow-through mode with switched off circulation in the water regeneration system, that significantly lowers operational costs. The use of successively connected biological reactor modules with low air consumption for the filler circulation allows to regulate the purification power of the water regeneration system by switching off or on the biological filter sections depending on the hydrobionts biomass in the pools, thus lowering the operational expenses. The use of a regeneration system-integrated compact aerolift, adjustable by the height and lifted water volume, provides for optimization of the water recirculation mode in dependence of the hydrobionts biomass in the pools, thus lowering the operational costs. The use of non-pressure device of water oxygenation allows to lower the oxygen consumption and optimize its usage. Universal water mechanical purification unit allows to use a mechanical filter of a labyrinth type with hydrostatic filler, as well as a mesh filter of a drum type.

The invention claimed is:
1. An industrial fish breeding complex, comprising:
a group of fish breeding pools and
a water regeneration system, located aside the pools and comprising
a mud settler-denitrificator, a device for water lifting and aeration, a multisectional modular biological filter, comprising biological filter modules, wherein each module comprising a biological reactor, made as a reservoir with four vertical walls and a rectangular horizontal cross-section, a reservoir bottom is sloped in a direction of a water movement and together with a plane of a water surface forms a diffuser which provides for favorable conditions for circulation of water and a filler in the biological reactor, in a lower part of a connection of the reservoir bottom and the vertical wall there is a channel for a sludge accumulation and discharge, which in an upper part is limited by a separation grid which prevents the filler of a biological filter from going into the channel, under the grid in the channel an aerator is placed, providing for accelerating a circulating water and filler flow with an ascending air stream from the aerator, as well as oxygenating the water;

a degassing unit and a disinfection unit, said group of pools being connected by a water supply distributing channel, a wastewater collecting channel, a common system of collecting and discharge of insoluble residues, and a mechanical filter of insoluble residues.

2. The industrial fish breeding complex according to claim 1, wherein for providing a water flow-through mode with a switched off water regeneration system the complex comprises a locking device of water supply into the water supply distributing channel from an outside source, and a locking device of a wastewater discharge from the wastewater collecting channel.

3. The industrial fish breeding complex according to claim 1, wherein the water regeneration system further comprises similar biological reactor modules, which are successively located and able to operate autonomously or in a group for regulation a biological filter power and an energy consumption depending on an increase or a decrease of a biomass amount in the pools.

4. The industrial fish breeding complex according to claim 1, wherein the device for water lifting and aeration is made as a flat separation wall sloped to a horizontal plane, which together with the vertical wall of a first biological filter module and the side vertical walls of the water regeneration system forms a confusor channel, in a lower part of which the aeration device is situated, and in an upper part a rift over an edge of a front wall is situated, and to increase an aerolift effect a sloping angle of the flat separation wall in respect to the vertical wall of the first biological filter may be changed in dependence to a water lifting height and a volume.

5. The industrial fish breeding complex according to claim 1, wherein the pools are supplied with water dosage units regulating a water flow, water disinfection systems, water oxygenation systems, water discharge systems providing for a water level regulation in the pools, and insoluble residues collecting and discharge systems.

6. The industrial fish breeding complex according to claim 1, wherein for water oxygenation in the fish breeding pools above a water level in the pools a balcony with a rolling flange is connected to an end wall, below the balcony at the bottom of the pool at the end wall an oxygen sprayer is located, and a water oxygenation is performed by spraying oxygen into water from the sprayer, during oxygen rising to a water surface, in a contact zone of non-dissolved oxygen from the sprayer with an inner surface of an uniform falling laminar water flow in a hermetic chamber, formed by a construction of the balcony, the uniform falling laminar water flow, pool side walls, its end wall and the water surface in the pool, and in a bubbling zone formed by the uniform falling laminar water flow in the fish breeding pool.

7. A method of water regeneration in the industrial fish breeding complex, comprising: a wastewater from fish breeding pools is collected to a collecting channel and supplied to a water regeneration system, successively passing the water through a mechanical purification unit to purify it from insoluble residues, a mud settler-denitrificator, the water is lifted with a pump or an aerolift, oxygenated, performed a water biological purification in biological filter modules, performed a disinfection with UV-radiation, degassed, supplied though a distributing supply channel to balconies of the pools.

8. The method according to the claim 7, wherein the water that enters the biological reactor, is moved along a sloped plane of a diffusor bottom to a lowest point, where a water and filler flow is lifted up by an ascending stream of an air sprayed from an aerator and is moved up, accelerating a circulation flow.

9. The method according the claim 7, wherein the water regeneration system is switched off for providing a water flow-through mode, and a water from an outer source through the opened locking device of water supply is supplied to a water supply channel, through a dosage device to the balcony of the pool, disinfected by UV-radiation, oxygenized, and supplied to the fish breeding pool, and a wastewater is discharged from the pool through a water level regulator in the pool and goes to the collecting channel, and then is discharged through the opened locking device for a wastewater discharge.

* * * * *